United States Patent [19]

Riccobono et al.

[11] Patent Number: 5,517,339
[45] Date of Patent: May 14, 1996

[54] METHOD OF MANUFACTURING HIGH EFFICIENCY, BROAD BANDWIDTH, VOLUME HOLOGRAPHIC ELEMENTS AND SOLAR CONCENTRATORS FOR USE THEREWITH

[75] Inventors: Juanita R. Riccobono, Nashua; Jaques E. Ludman, Hollis, both of N.H.

[73] Assignee: Northeast Photosciences, Hollis, N.H.

[21] Appl. No.: 261,451

[22] Filed: Jun. 17, 1994

[51] Int. Cl.⁶ .............................. G02B 5/32; G03H 1/02
[52] U.S. Cl. .................... 359/15; 359/19; 359/3
[58] Field of Search ................... 359/1, 3, 15, 22, 359/19; 136/246

[56] References Cited

U.S. PATENT DOCUMENTS

| | | | |
|---|---|---|---|
| 3,660,091 | 5/1972 | Shankoff et al. | 359/3 |
| 3,953,105 | 4/1976 | Ih | 359/15 |
| 4,204,881 | 5/1980 | McGrew | 359/19 |
| 4,235,505 | 11/1980 | Hariharan et al. | 359/24 |
| 4,312,559 | 1/1982 | Kojima et al. | 359/19 |
| 4,367,366 | 6/1983 | Bloss et al. | 136/246 |
| 4,402,306 | 9/1983 | McElroy | 359/19 |
| 4,418,238 | 11/1983 | Lidorenko et al. | 136/246 |
| 4,458,980 | 7/1984 | Ohki et al. | 359/17 |
| 4,720,158 | 1/1988 | Kuwayama et al. | 359/19 |
| 4,807,978 | 2/1989 | Grinberg et al. | 359/24 |
| 4,824,191 | 4/1989 | Kato et al. | 359/19 |
| 4,826,290 | 5/1989 | Wreede et al. | 359/3 |
| 5,039,352 | 8/1991 | Mueller et al. | 359/19 |
| 5,221,977 | 6/1993 | Lieb et al. | 359/19 |
| 5,282,066 | 1/1994 | Yu et al. | 359/24 |

FOREIGN PATENT DOCUMENTS

| | | | |
|---|---|---|---|
| 63-305581 | 12/1988 | Japan | 359/24 |
| 1-222237 | 9/1989 | Japan | 359/24 |
| 1-238680 | 9/1989 | Japan | 359/24 |

OTHER PUBLICATIONS

"Laser Focus," Holographic Optics Concentrate Solar Rays, Dec. 1981, pp. 38–42.

"Applied Optics," Nonconventional optical systems and brightness theorem, Welford and Winston, vol. 21, No. 9, 1 May 1982.

Primary Examiner—Paul M. Dzierzynski
Assistant Examiner—Audrey Chang
Attorney, Agent, or Firm—Adam Erlich

[57] ABSTRACT

An improved method of manufacturing holographic elements for solar concentrator, which is a necessity for the future of viable low cost solar power. Utilizing extremely high relative humidity levels during the fabrication of holographic plates, exposing the holographic plate to electromagnetic radiation at particular humidity levels, and having a relative angle between recording beams during exposure makes it possible to fabricate high efficiency holographic elements that diffract over a broad bandwidth. These high efficiency, broad bandwidth holographic elements are most effective in certain solar concentrating systems.

15 Claims, 5 Drawing Sheets

METHOD OF MANUFACTURING HIGH EFFICIENCY, BROAD BANDWIDTH, VOLUME HOLOGRAPHIC ELEMENTS AND SOLAR CONCENTRATORS FOR USE THEREWITH

BACKGROUND OF THE INVENTION

This invention relates generally to holographic elements, and more particularly to the manufacture of holographic elements that are highly efficient and have a large bandwidth. These holographic elements are especially well suited to be used as solar concentrators and are most effective as part of solar concentrating systems.

Holography is a technique for recording and later reconstructing the amplitude and phase distribution of a coherent wave disturbance. Generally, the technique utilized for producing a holographic element is accomplished by recording the pattern of interference between two optical beams or waves. These waves, one for example, reflected from an object, usually called the object wave, and the other which by-passes the object, usually called the reference wave, strike a light-sensitive recording medium such as a holographic film or plate. Thus incident on the recording medium is the sum of the light from the object and the mutually coherent reference wave.

While all light sensitive recording media respond only to light intensity, in the pattern of the interference between the two waves there is preserved a complete record of the amplitude and also the phase distribution of one of the waves with respect to the other. Amplitude information is preserved as a degree of modulation or in the depth of the interference fringes, while phase information is preserved as variations of the positions or pattern of the fringes.

Although a holographic element is recorded utilizing one wavelength (created by a laser) it can diffract either a narrow or broad bandwidth depending upon the fabrication parameters of the holographic element. In the case of a broad bandwidth holographic element on playback, other wavelengths will form a spectrum of wavelengths around the recorded wavelength. Unfortunately, when utilizing conventional holographic elements for concentrating visible light (where the wavelengths differ by a factor of 2) much of the original light is lost. In fact, it is typical for conventional holographic elements to have expected efficiencies of only 10% when diffracting or concentrating across a broad bandwidth. This presents particular problems when attempting to utilize holographic elements for solar concentrators.

SUMMARY OF THE INVENTION

The present invention overcomes the problems encountered in the past by providing an improved method of manufacturing a volume holographic element (a holographic element where the fringes are in the bulk of the light sensitive recording media rather than on the surface) which is highly efficient over a broad bandwidth.

The unique method defined by this invention accomplishes the above by fabricating the holographic plate at extremely high humidity levels preferably in excess of 95% relative humidity, then slowly reducing humidity levels during the process. In fact, the photographic plate must be exposed when it is at 50–60% relative humidity. Although it is known in the art that some humidity during the fabrication of the holographic plate can have a positive effect on the efficiency of a holographic element, previous work in this area has shown that extremely high humidity levels tend to negatively effect the production of an efficient holographic element. Changing other fabrication parameters allows the high humidity regime to be exploited with the resultant high efficiency, high bandwidth holographic elements. Another factor which is important in creating high-efficiency, broad bandwidth holographic elements is having a very thin coating of holographic gelatin on the holographic plate. In addition to the above mentioned humidity factor and the thickness of the holographic gelatin on the holographic plate, during exposure, with the present invention the relative angle of the recording beams is crucial for maximizing the bandwidth and efficiency of the holographic element.

It is therefore an object of this invention to provide an improved method of manufacturing holographic elements, which are both highly efficient and can diffract a broad bandwidth of light.

It is another object of this invention to manufacture these holographic elements with additional optical attributes which would allow them to be effective as solar concentrators/diffractors. These holographic elements would be capable of concentrating light at a ratio of at least 100:1 and could disperse electromagnetic radiation into its component wavelengths and direct the light to solar cells optimized for a particular band of wavelengths. Additionally, far infrared light would be directed away from the solar cells to prevent the solar cells from being heated. Heat causes the solar cells to be less efficient.

For a better understanding of the present invention, together with other and further objects thereof, reference is made to the following description taken in conjunction with the accompanying drawings and claims.

DETAILED DESCRIPTION

DETAILED DESCRIPTION OF THE PREFERRED METHOD AND EMBODIMENTS

In order to fully understand the embodiments of this invention, it is first necessary to describe the technique of this invention for producing a holographic element including how to fabricate the holographic plate utilized to produce the holographic element.

In producing the holographic element of this invention, it is first necessary to produce a sensitized gelatin. This gelatin can be manufactured in a number of conventional ways including the preferred method described below. Deionized water is combined with chromium aluminum (1%) and Kodak Photoflo in the proportion of 49:1 of deionized water to chromium aluminum. One drop of Kodak photoflo is added for each 50 mL of deionized water-chromium aluminum solution. This solution is gradually added to and mixed with holographic grade gelatin (such as Kind & Knox holographic grade gelatin). 14 mL of the deionized water-chromium solution is added for each gram of gelatin. The deionized water-chromium solution is added to the gel in three doses and allowed to sit for 20 to 30 minutes between each dose.

To sensitize the gelatin add 0.473 grams of Ammonium Dichromate for every gram of the gelatin and then heat to 40 degrees centigrade. The mixture is filtered through course paper to produce gelatin 106.

Figure 1:
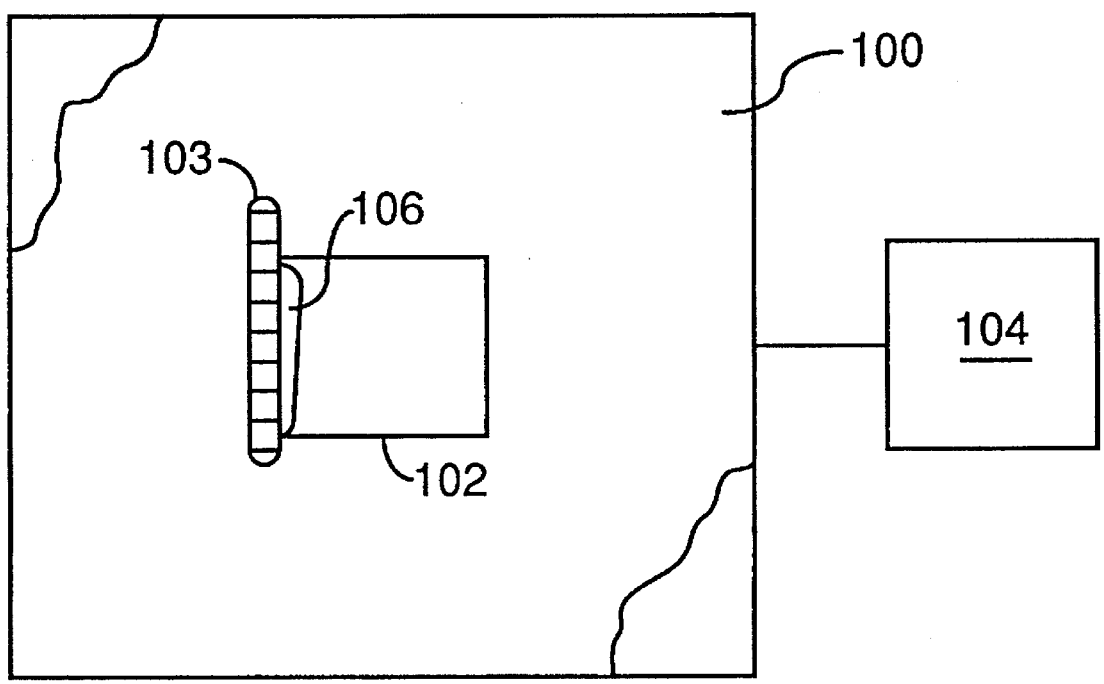
FIG. 1 is a pictorial, schematic representation of the technique of this invention for manufacturing the holographic plate of high efficiency broad bandwidth holographic elements.

Reference is now made to FIG. 1 to describe how a holographic plate 1 of this invention is fabricated. The sensitized gelatin 106 is rolled onto a clean flat glass plate 102 of 20th wave quality in a clean room 100 with at greater than 90% (preferably greater than 95%) relative humidity. The humidity of clean room 100 is controlled by a conventional humidity controlling device 104. The sensitized gelatin 106 is rolled onto the glass plate 102 with, for example, a Mayer Rod 103. The gel thickness on plate 102 must be between 2 to 4 microns. Once plate 102 is coated it must remain in an environment of at least 90% (preferably at least 95%) relative humidity for at least 24 hours. Then the humidity should be slowly decreased to about 25% to 40% (preferably 30% to 35%) relative humidity over the next 24 hours, thereby producing a holographic plate 1.

Figure 2A:
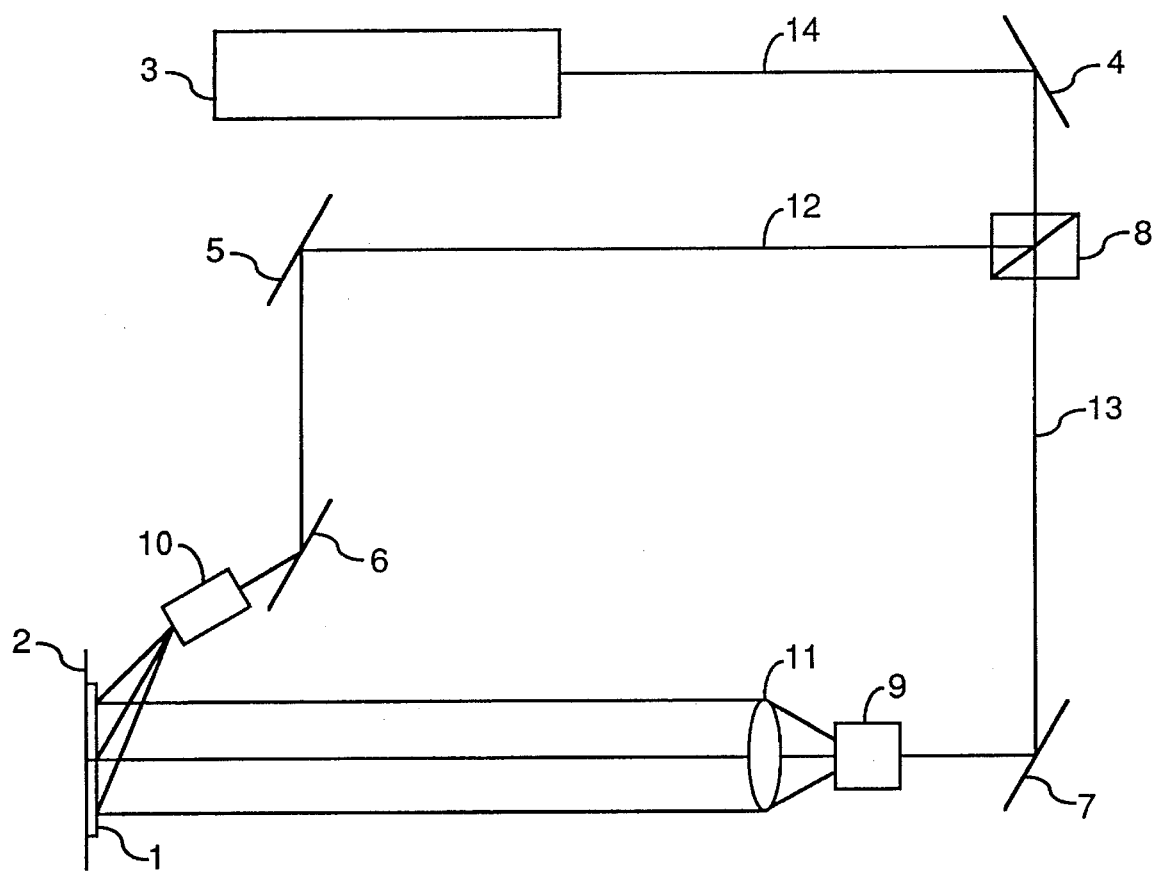
FIG. 2(a) is a schematic representation of the technique of this invention for manufacturing a high efficiency, broad bandwidth holographic element.

Reference is now made to FIG. 2(a) in order to fully describe one of the techniques which may be utilized to expose the holographic plate 1 and fabricate a high efficiency broad bandwidth holographic element. Still in the room 100, a laser 3, preferably argon and tuned to 488 nm, is used to generate a beam of laser light 14 that is reflected by mirror 4 to beam splitter 8. Beam splitter 8 splits the beam into beam 12 and beam 13. Mirror 5 reflects beam 12 to mirror 6. Mirror 6 reflects beam 12 into spatial filter 10. Spatial filter 10 causes beam 12 to diverge and directs it to holographic plate 1, which is mounted on black diffusing plate 2. Mirror 7 reflects beam 13 into spatial filter 9. Spatial filter 9 causes beam 13 to diverge. Lens 11 collimates beam 13 and directs it to holographic plate 1 at a 90 degree angle.

Figure 2B:
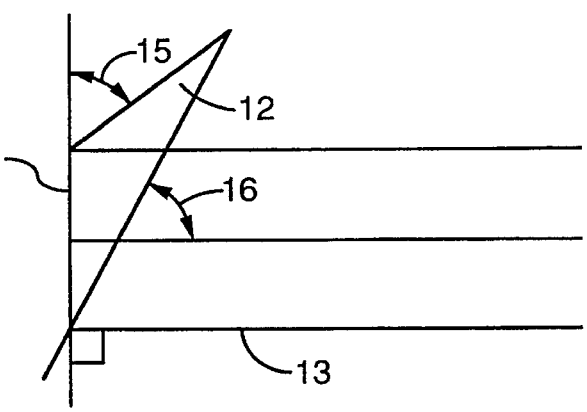
FIG. 2(b) is a close-up schematic representation of the relative angles between the diverging beam, collimated beam, and the holographic plate.

Reference is now made to FIG. 2(b). Angle 15 between diverging beam 12 and holographic plate 1 must be between 60 and 75 degrees to fabricate a holographic element for use with most conventional solar cells. Angle 16 between the collimated beam 13 and the diverging beam 12 must be between 15 and 80 degrees in order to create the broad bandwidth, high efficiency holographic element of this invention. Although specific components are set forth above, it should be realized that equivalent components can be substituted therefore within the scope of this invention.

It is, however, essential that during the process of exposing the holographic plate 1 room 100 must be at between 50–60% relative humidity. In addition, laser 3 is controlled to produce beam 12 and beam 13 at 0.2 milliwatts/cm$^2$. Exposures of 100 seconds lead to exposures of 40 mJ/cm$^2$. After holographic plate 1 is exposed it is detached from diffusing plate 2, fixed, cleaned with warm water, and dried using alcohol baths. The holographic plate 1 can be protected by covering it with another glass plate in a conventional manner to form holographic element 45 using a UV curing adhesive (not shown).

Figure 3:
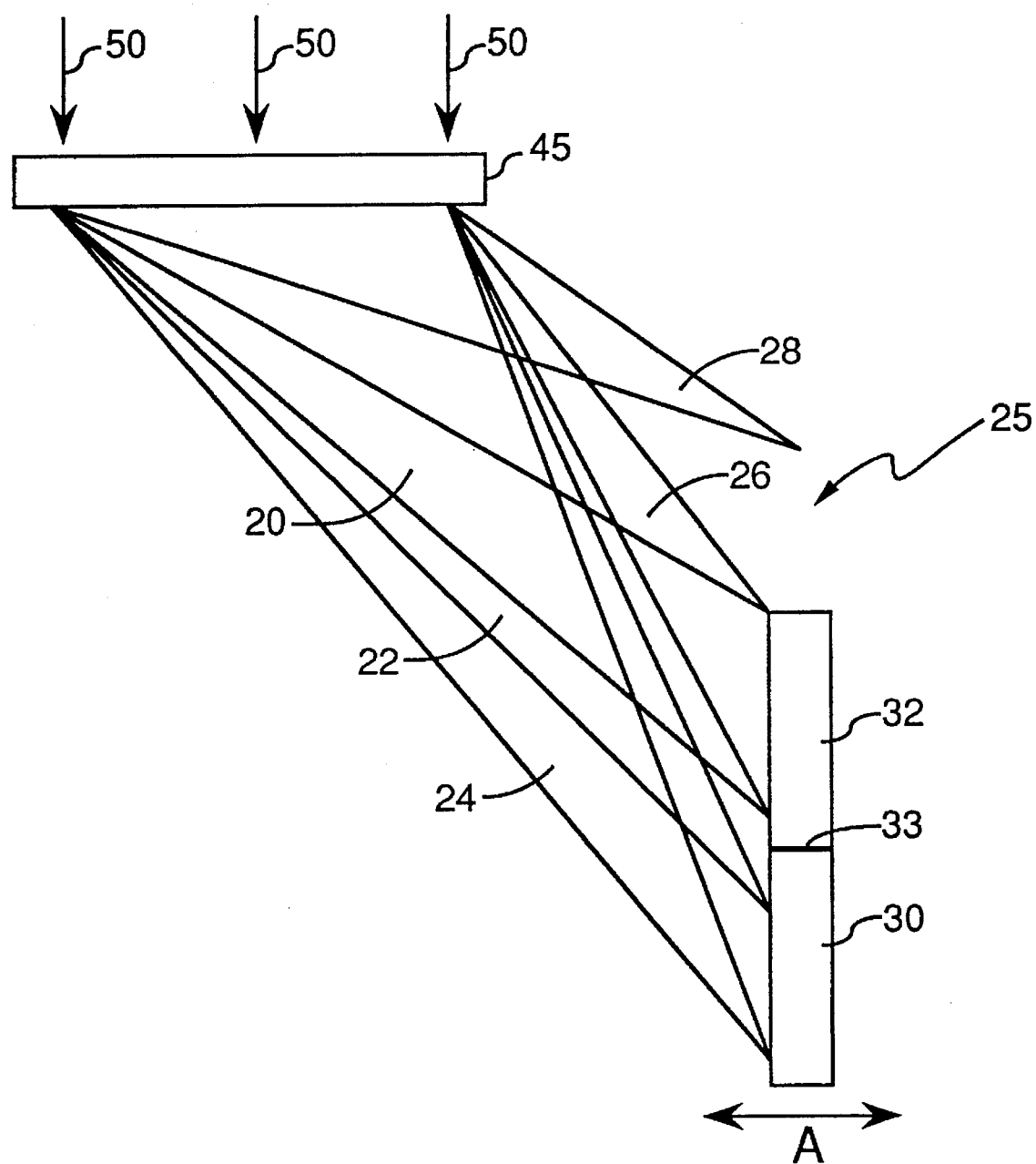
FIG. 3 is a schematic representation of a holographic solar concentrating system utilizing a holographic element made with the method of this invention.

FIG. 3 will be referred to for illustrating the operation of the solar concentrator 25 which incorporates holographic element 45 therein. Solar radiation 50 is spectrally divided into red light 20, green light 22, blue light 24, near infrared 26, and far infrared 28 by holographic element 45. In fact, holographic element 45 works across a bandwidth where wavelengths differ by a factor of at least 1.5. Holographic element 45 diffracts green light 22 and blue light 24 to a conventional solar cell 30 optimized for converting blue-green light into electricity. Holographic element 45 diffracts red light 20 and near infrared 26 to a conventional solar cell 32 optimized for converting red and near infrared light into electricity. Holographic element 45 diffracts far infrared 28 far enough away from solar cells 30, 32 so that they are not heated by the far infrared light.

Solar cells 30 and 32 can be either moved to the left or right as indicated by arrow A within FIG. 3 so that the red light 20, green light 22, and blue light 24 do not converge directly on the solar cells. This prevents the light from being excessively concentrated as it reaches the solar cells. Also different arrangements of the cell-holographic element geometry effect junction 33 and the purity of the light near junction 33. By choosing the parameters correctly minimum wavelength mixing occurs at the edge between solar cell 30 and solar cell 32 is optimal.

Figure 4:
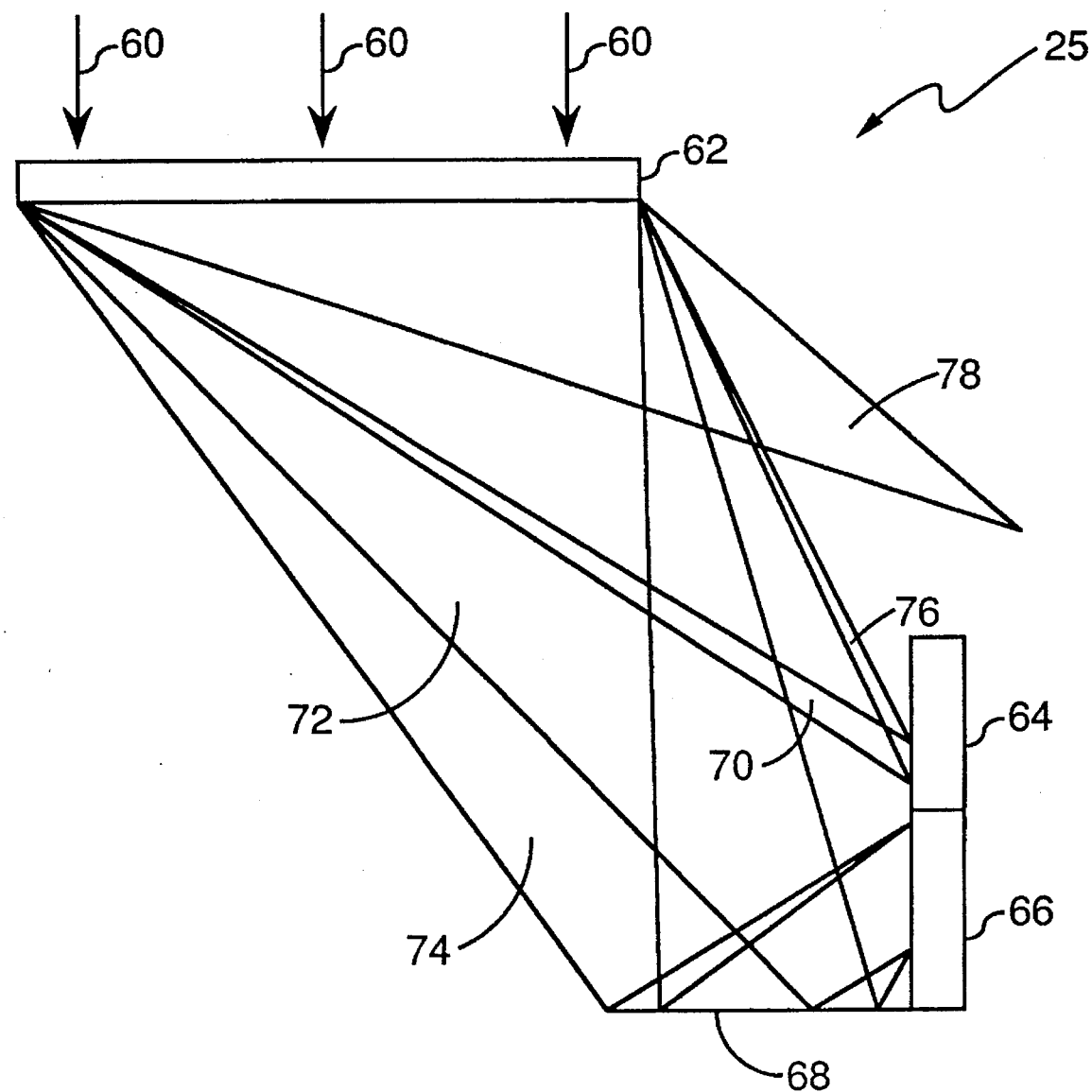
FIG. 4 is a schematic representation of a solar concentrating system utilizing reflecting means.

FIG. 4 will be referred to for illustrating the operation of solar concentrator 25 in combination with reflecting means 68. Solar radiation 60 is spectrally divided into red light 70, green light 72, blue light 74, near infrared 76, and far infrared 78 by holographic element 62 made by the method of this invention. Holographic element 62 diffracts red light 70 and near infrared 76 to a solar cell 64 optimized for converting red and near infrared light into electricity. Holographic element 62 diffracts green light 72 and blue light 74 to reflecting means 68. Reflecting means 68 reflects green light 72 and blue light 74 to solar cell 66, which is optimized for converting blue and green light into electricity. Holographic element 62 diffracts far infrared 78 far enough away from solar cells 30, 32 so that they are not heated by the far infrared light. The reflecting means 68 is utilized to save material in the manufacture of the solar cells and therefore reduce overall cost of manufacture.

Figure 5:
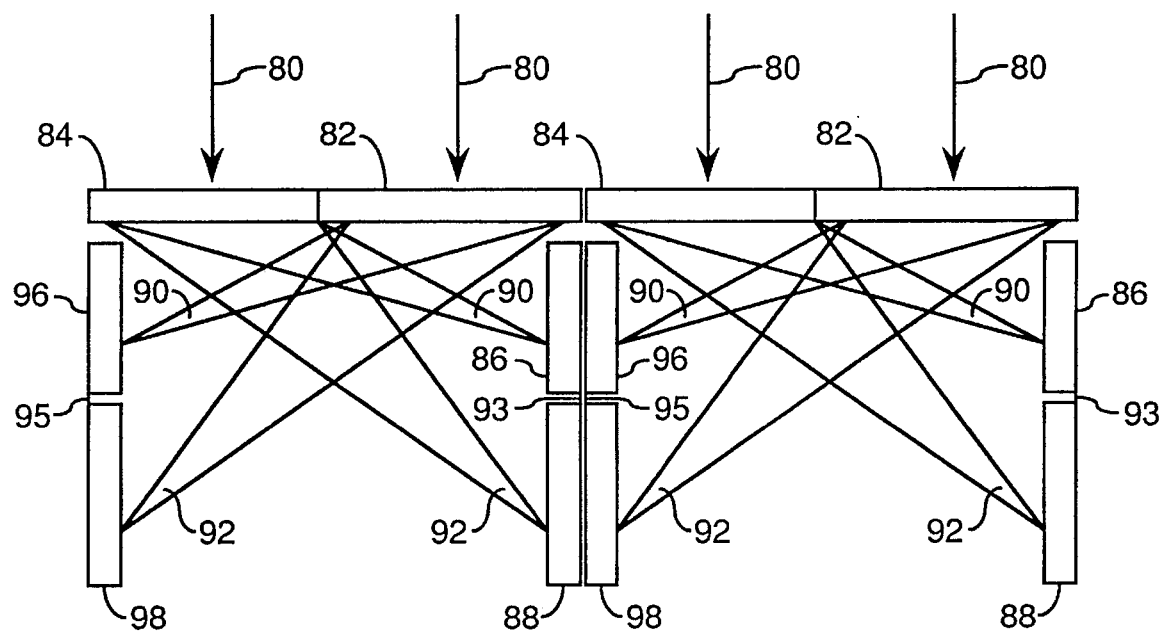
FIG. 5 is a side view of several holographic elements working as tiled pairs as part of a solar concentrating system.

FIG. 5 will be referred to for describing how to utilize holographic elements 82 and 84 in tiled pairs. Solar radiation 80 is spectrally divided into red-infrared light 90, green-blue light 92 by holographic element 82. Red-infrared light 90 is diffracted to solar cell 96 that is optimized for converting red and near infrared light into electricity. Green-blue light 92 is diffracted to solar cell 98 that is optimized for converting green-blue light into electricity. Solar cells 96 and 98 are affixed to a support or post 95 at an appropriate distance so that they will each receive the radiation that they are optimized for.

Solar radiation 80 is spectrally divided into red-infrared light 90, green-blue light 92 by holographic element 84. Red-infrared light 90 is diffracted to solar cell 86 that is optimized for converting red and near infrared light into electricity. Green-blue light 92 is diffracted to solar cell 88 that is optimized for converting green-blue light into electricity. Solar cells 86 and 88 are affixed to post 93 at the same points that solar cells 96 and 98 are affixed to post 95.

The distance from post 93 to 95 is chosen so that the holographic elements 82 and 84 can direct the appropriate light to the appropriate solar cell. Furthermore, holographic elements 82 and 84 are constructed with an angle of diffraction that will direct the diffracted light to the appropriate solar cell, without necessitating space between the holographic elements 82 and 84 to achieve this affect. The proper angles of diffraction and distance between posts 93 and 95 make it possible to completely tile an area with holographic elements 82 and 84 without necessitating any space between holographic elements 82 and 84.

Although this invention has been described with reference to particular embodiments, it will be understood to those skilled in the art that this invention is also capable of a variety of further embodiments within the spirit and scope of the appended claims.

We claim:

1. An improved method of producing a highly efficient, broad bandwidth holographic element comprising the steps of:
    (a) providing an enclosed space having a controllable relative humidity in which to produce said holographic element;
    (b) coating a medium in said enclosed space with a coat of sensitized gelatin to a thickness of between 2 and 4 microns to form a holographic plate;
    (c) maintaining said relative humidity within said enclosed space at greater than 90% during said coating step for a preselected period of time;
    (d) decreasing said relative humidity within said enclosed space to between 25% and 40% and maintaining said 25% to 40% relative humidity for another preselected period of time;
    (e) exposing said holographic plate to beams of electromagnetic radiation in said enclosed space; and
    (f) maintaining said enclosed space at approximately 50% to 60% relative humidity for a preselected period of time during said exposing step in order to produce said holographic element.

2. An improved method of producing a highly efficient, broad bandwidth holographic element as defined in claim 1 wherein said sensitized gelatin comprises holographic grade gelatin, chromium aluminum, Photoflo, deionized water, and ammonium dichromate.

3. An improved method of producing a highly efficient, broad bandwidth holographic element as defined in claim 1 wherein during said coating step said relative humidity is maintained at greater than 90% for at least 24 hours and said relative humidity is decreased to between 25% and 40% over a time period of approximately 24 hours.

4. An improved method of producing a highly efficient, broad bandwidth holographic element as defined in claim 1, wherein said beams of electromagnetic radiation utilized for exposing said holographic plate are mutually coherent beams of light that are created by splitting a coherent laser beam into both a diverging and a collimated beam, where the angle between said diverging beam and said holographic plate is between 60 and 75 degrees and the angle between said diverging beam and said collimated beam is between 15 and 80 degrees.

5. A solar concentrator arrangement comprising at least one solar cell and a holographic means associated therewith for diffracting, spectrally dispersing, and intensifying with a diffraction efficiency of 90% to 98% of said incident radiation across a bandwidth extending between a longest efficiently diffracted wavelength and a shortest efficiently diffracted wavelength, where said longest efficiently diffracted wavelength is at least 1.5 times larger than said shortest efficiently diffracted wavelength, said holographic means further imaging said incident radiation to said at least one solar cell, wherein said at least one solar cell is at approximately a 90 degree angle to said holographic means and wherein said incident radiation is tailored to the light absorption and photovoltaic conversion characteristics of said at least one solar cell.

6. A solar concentrator arrangement as defined in claim 5, wherein said holographic means is produced by the following method, said method including the steps of:
    (a) providing an enclosed space having a controllable relative humidity in which to produce said holographic element;
    (b) coating a medium in said enclosed space with a coat of sensitized gelatin to a thickness of between 2 to 4 microns to form a holographic plate;
    (c) maintaining said relative humidity within said enclosed space at greater than 90% during said coating step for a preselected period of time;
    (d) decreasing said relative humidity within said enclosed space to between 25% and 40% and maintaining said 25% to 40% relative humidity for another preselected period of time;
    (e) exposing said holographic plate to beams of electromagnetic radiation in said enclosed space; and
    (f) maintaining said enclosed space at approximately 50% to 60% relative humidity for a preselected period of time during said exposing step in order to produce said holographic element.

7. A solar concentrating arrangement as defined in claim 6 wherein said beams of electromagnetic radiation utilized for exposing said holographic plate are a coherent beam of light that is split into both a diverging and a collimated beam where the angle between said diverging beam and said holographic plate is between 60 and 75 degrees and the angle between said collimated beam and said diverging beam is between 15 and 80 degrees.

8. A solar concentrator arrangement as defined in claim 5, wherein at least two solar cells are provided, each of said solar cells having differing light absorption and photovoltaic conversion characteristics, and wherein said holographic means exposes the respective solar cells to an impingement of associated spectral range of said incident radiation.

9. A solar concentrator arrangement as defined in claim 8, wherein a conventional reflecting means reflects a portion of said associated spectral range of said incident radiation at each of said respective solar cells, and wherein said conventional reflecting means does not further concentrate said incident radiation.

10. A solar concentrator arrangement comprising at least two solar cells and at least two holographic means, wherein each of said holographic means is associated with at least one of said solar cells, said holographic means are for diffracting, spectrally dispersing, and intensifying 90% to 98% of incident radiation across a bandwidth extending between a longest efficiently diffracted wavelength and a shortest efficiently diffracted wavelength, where said longest efficiently diffracted wavelength is at least 1.5 times larger than said shortest efficiently diffracted wavelength, said holographic means further imaging said incident radiation to said solar cell, wherein said incident radiation is tailored to the light absorption and photovoltaic conversion characteristics of said solar cell; and
    said solar cells are affixed to each of at least two posts such that said solar cells are at approximately a 90 degree angle to said at least two holographic means, said posts are at a sufficient distance from each other such that at least two of said holographic means can diffract said associated spectral range of incident radiation to said respective solar cells without necessitating any gaps between said holographic means, and an angle of diffraction of said holographic elements is utilized such that said holographic elements can diffract an associated spectral range of incident radiation to said respective solar cell without necessitating any gaps between said holographic elements.

11. A solar concentrator arrangement as defined in claim 10, wherein said at least two solar cells are provided for each of said posts, each of said solar cells having differing light absorption and photovoltaic conversion characteristics and wherein said solar cells are at approximately a 90 degree angle to said at least two holographic means, and wherein said holographic means exposes the respective cells to an impingement of an associated spectral range of the incident radiation.

12. A solar concentrator arrangement according to claim 10, further comprises a reflecting means for reflecting a portion of said associated spectral range of said incident radiation at each of said respective solar cells.

13. A broad bandwidth, high efficiency holographic element for redirecting and concentrating a beam of electromagnetic radiation, wherein said holographic element is produced by the following method, said methods including the steps of:

(a) providing an enclosed space having a controllable relative humidity in which to produce said holographic element;

(b) coating a medium in said enclosed space with a coat of sensitized gelatin to a thickness of between 2 to 4 microns to form a holographic plate;

(c) maintaining said relative humidity within said enclosed space at greater than 90% during said coating step for a preselected period of time;

(d) decreasing said relative humidity within said enclosed space to between 25% and 40% and maintaining said 25% to 40% relative humidity for another preselected period of time;

(e) exposing said holographic plate to beams of electromagnetic radiation in said enclosed space; and (f) maintaining said enclosed space at approximately 50% to 60% relative humidity for a preselected period of time during said exposing step in order to produce said holographic element.

14. A broad bandwidth, highly efficient holographic element as defined in claim 13 wherein said beams of electromagnetic radiation utilized for exposing said holographic plate are a coherent beam of light that is split into both a diverging and a collimated beam where the angle between said diverging beam and said holographic plate is between 60 and 75 degrees.

15. A broad bandwidth, highly efficient holographic element as defined in claim 13 wherein said beams of electromagnetic radiation utilized for exposing said holographic plate are mutually coherent beams of light that are created by splitting a coherent laser beam into both a diverging and a collimated beam, wherein the angle between said diverging beam and said collimated beam is between 15 and 80 degrees.

* * * * *